(12) United States Patent
Rogalla et al.

(10) Patent No.: US 11,149,819 B2
(45) Date of Patent: Oct. 19, 2021

(54) DEVICE AND METHOD FOR ATTACHING A BALANCING WEIGHT TO A MOUNTING SURFACE ON AN INNER SIDE OF A WHEEL RIM

(71) Applicant: Schenck RoTec GmbH, Darmstadt (DE)

(72) Inventors: Martin Rogalla, Darmstadt (DE); Andreas Peinelt, Pfungstadt (DE); Kevin Weissbach, Gelenau (DE)

(73) Assignee: Schenck RoTec GmbH, Darmstadt (DE)

( * ) Notice: Subject to any disclaimer, the term of this patent is extended or adjusted under 35 U.S.C. 154(b) by 171 days.

(21) Appl. No.: 16/329,848

(22) PCT Filed: Sep. 13, 2017

(86) PCT No.: PCT/DE2017/100774
§ 371 (c)(1),
(2) Date: Mar. 1, 2019

(87) PCT Pub. No.: WO2018/050162
PCT Pub. Date: Mar. 22, 2018

(65) Prior Publication Data
US 2019/0257387 A1 Aug. 22, 2019

(30) Foreign Application Priority Data
Sep. 15, 2016 (DE) .................. 10 2016 117 434.3

(51) Int. Cl.
*G01M 17/00* (2006.01)
*G01M 1/00* (2006.01)
(Continued)

(52) U.S. Cl.
CPC ......... *F16F 15/345* (2013.01); *B25J 17/0241* (2013.01); *B29C 65/48* (2013.01);
(Continued)

(58) Field of Classification Search
CPC .. G01M 17/02; G01M 17/021; G01M 17/022; G01M 17/027; G01M 17/025;
(Continued)

(56) References Cited

U.S. PATENT DOCUMENTS 3,805,623 A * 4/1974 Seghesio .............. G01R 13/208
73/459
3,877,315 A * 4/1975 Carrigan ................. G01M 1/12
73/459
(Continued)

FOREIGN PATENT DOCUMENTS

DE 10 2004 048896 A1 4/2006
DE 10 2007 014 461 A1 7/2008
(Continued)

OTHER PUBLICATIONS

International Search Report in PCT/DE2017/100774, dated Jan. 4, 2018.

*Primary Examiner* — Andre J Allen
(74) *Attorney, Agent, or Firm* — Collard & Roe, P.C.

(57) ABSTRACT

The invention relates to a device for attaching a balancing weight (2) to a mounting surface (17) on an inner side (3) of a rim dish of a wheel rim (4) and provides for a mounting head (1) to be dimensioned in such a way that it fits into the rim dish. The mounting head (1) includes a support element (5), which is radially displaceable relative to the wheel rim (4) and on which a feeler element (6) is axially movably arranged, the feeler element (6) having a convex contact surface (14) and a receptacle (12) for at least one balancing weight (2), said receptacle being oriented towards the inner side (3). The mounting head (1) is configured in such a way that the contact surface (14) may be brought into contact with a boundary surface (18) of the inner side (3), and may be displaced along said boundary surface until the balancing
(Continued)

weight (2) comes radially into contact with the mounting surface (17).

14 Claims, 2 Drawing Sheets

(51) Int. Cl.
  *F16F 15/34* (2006.01)
  *B29C 65/48* (2006.01)
  *B29C 65/00* (2006.01)
  *G01M 1/32* (2006.01)
  *B60B 7/06* (2006.01)
  *B25J 17/02* (2006.01)
  *B25J 9/16* (2006.01)
  *F16F 15/32* (2006.01)
  *F16F 15/133* (2006.01)

(52) U.S. Cl.
  CPC ............ *B29C 66/742* (2013.01); *B60B 7/063* (2013.01); *G01M 1/326* (2013.01); *B25J 9/1687* (2013.01); *B29C 66/712* (2013.01); *F16F 15/133* (2013.01); *F16F 15/324* (2013.01)

(58) Field of Classification Search
  CPC .... G01M 17/024; G01M 17/10; G01M 1/045; G01M 17/0076; G01M 17/013; G01M 17/03; G01M 17/04; G01M 17/06; G01M 17/08; G01M 1/02; G01M 1/12; G01M 1/16; G01M 1/225; G01M 3/04; G01M 3/40; G01M 5/0091; G01M 7/02; G01M 99/00; G01M 99/002; G01M 7/08; B60C 23/0494; B60C 2019/004; B60C 23/0493; B60C 23/064; B60C 19/00; B60C 23/04; B60C 23/0488; B60C 23/0498; B60C 23/0496; B60C 23/0408; B60C 23/041; B60C 23/0411; B60C 23/06; B60C 23/20; B60C 11/246; B60C 23/0486; B60C 23/061; B60C 11/243; B60C 99/00; B60C 11/0083; B60C 13/003; B60C 2009/2038; B60C 23/004; B60C 23/02; B60C 23/0401; B60C 23/0406; B60C 23/0416; B60C 23/0433; B60C 23/0455; B60C 23/0459; B60C 23/0474; B60C 23/0489; B60C 23/0491; B60C 25/002; B60C 25/005; B60C 25/007; B60C 29/02; B60C 3/04; B60C 99/006; B60C 11/0332; B60C 11/24; B60C 13/001; B60C 13/02; B60C 15/0036; B60C 17/02; B60C 2009/0071; B60C 2009/2022; B60C 2200/02; B60C 2200/06; B60C 2200/065; B60C 23/00; B60C 23/001; B60C 23/003; B60C 23/007; B60C 23/008; B60C 23/0413; B60C 23/0427; B60C 23/0447; B60C 23/0454; B60C 23/0457; B60C 23/0462; B60C 23/0471; B60C 23/0472; B60C 23/0476; B60C 23/0479; B60C 23/0483; B60C 23/0484; B60C 23/065; B60C 23/066; B60C 23/10; B60C 25/0548; B60C 25/056; B60C 25/132; B60C 25/138; B60C 29/005; B60C 9/005; B60C 9/18; B60C 9/1807; B60C 9/20; B60C 9/28
  USPC .................................................. 73/147–146.8
  See application file for complete search history.

(56) References Cited

U.S. PATENT DOCUMENTS

| | | | |
|---|---|---|---|
| 4,576,044 A * | 3/1986 | Boni | G01B 5/02 33/203.12 |
| 5,557,043 A | 9/1996 | Drechsler | |
| 5,587,528 A * | 12/1996 | Rothamel | G01M 1/02 73/462 |
| 6,539,852 B2 | 4/2003 | Ertl | |
| 6,672,158 B1 * | 1/2004 | Goebel | G01M 1/02 73/462 |
| 7,368,024 B2 * | 5/2008 | Majumdar | B29D 30/0633 152/154.1 |
| 2004/0050159 A1 * | 3/2004 | Corghi | G01M 1/02 73/462 |
| 2010/0058859 A1 | 3/2010 | Rogalla et al. | |
| 2010/0147458 A1 | 6/2010 | Donnay et al. | |
| 2011/0197672 A1 | 8/2011 | Peinelt et al. | |
| 2015/0027225 A1 | 1/2015 | Rogalla | |

FOREIGN PATENT DOCUMENTS

| | | |
|---|---|---|
| DE | 10 2010 002 002 A1 | 8/2011 |
| DE | 10 2007 014 461 B4 | 3/2012 |
| DE | 10 2013 108 048 B4 | 6/2015 |
| EP | 0 681 169 A2 | 11/1995 |
| EP | 1 124 123 A2 | 8/2001 |
| EP | 1 759 893 A1 | 3/2007 |

\* cited by examiner

DEVICE AND METHOD FOR ATTACHING A BALANCING WEIGHT TO A MOUNTING SURFACE ON AN INNER SIDE OF A WHEEL RIM

CROSS REFERENCE TO RELATED APPLICATIONS

This application is the National Stage of PCT/DE2017/100774 filed on Sep. 13, 2017, which claims priority under 35 U.S.C. § 119 of German Application No. 10 2016 117 434.3 filed on Sep. 15, 2016, the disclosure of which is incorporated by reference. The international application under PCT article 21 (2) was not published in English.

BACKGROUND OF THE INVENTION

1. Field of the Invention

The invention relates to a device for attaching a balancing weight to a mounting surface on an inner side of a rim dish of a wheel rim, and provides for a mounting head to be dimensioned in such a way that it fits into the rim dish and which includes a support element, which is radially displaceable relative to the wheel rim and on which a feeler element is axially movably arranged. Furthermore, the invention relates to a method for attaching a balancing weight to a mounting surface on an inner side of a rim dish of a wheel rim.

2. Description of the Related Art

When balancing vehicle wheels, detected imbalances are compensated by mounting balancing weights on the wheel rims, since material removal is out of the question. For this purpose, in the case of steel rims, the balancing weights are clamped on the inner and outer edge of the wheel rim of the corresponding balancing points. In contrast, in the case of alloy rims, the balancing weights are usually glued in the rim dish in two axially spaced balancing planes.

From DE 10 2007 014 461 A1, a method for balancing vehicle wheels is known, in which adhesive weights are glued to at least one determined balancing surface within a vehicle wheel by using a balancing head and a program-controlled handling device.

Furthermore, from DE 10 2010 002 002 A1 a fully automatic system for balancing imbalances of vehicle wheels is known, in which the imbalance of the vehicle wheels is first measured in an imbalance measuring station and the vehicle wheels are then conveyed into a balancing station. In the balancing station, the balancing weights, which are produced to a suitable size on the basis of the measured values by an automatic cutting device, and which are provided with an adhesive layer, are fastened by gluing to the vehicle wheels by means of a mounting device. The mounting is carried out with the aid of a setting head, which is provided with two receptacles for two balancing weights and which may secure them sequentially in two balancing planes of the vehicle wheel intended therefor.

DE 10 2013 108 048 B4 describes a device for mounting balancing weights for balancing imbalances on a rotating body to be balanced, having a supply unit, which may successively supply individual balancing weights, a mounting device which is intended and provided for attaching the balancing weights to a rotating body to be balanced and which has a first receptacle for a first balancing weight and a second receptacle for a second balancing weight.

Due to weight considerations, alloy wheels or disc wheels with undercuts are often used in which there is a cavity in front of the spoke root. The balancing weights should preferably be inserted into an annular surface (undercut annular surface) provided thereon.

In the case of wheel rims with an undercut, the space permitted for attaching a balancing weight in the axial direction is extremely limited. This is essentially due to the fact that the rim contour is fixed on the tyre-facing side, which means that the height of the mounting surface, which is used for attaching the balancing weight, is severely limited. The balancing weight must not protrude into the radii above or below the mounting surface, which results in a reduction in the adhesion of the balancing weights. An automatic balancing of vehicle wheels with undercuts is known from DE 10 2007 014 461 B4. The rolling roller for attaching the adhesive weight has a conical rolling surface, so that the undercut annular surface may be reached by a tangential rolling process. The disadvantage, however, is that the robot control is very onerous and the adhesive weights may not be placed accurately. Alternatively, the undercut surface may be measured before attaching the balancing weights, but this is complicated by the painting of the wheel rim and is also time-consuming.

SUMMARY OF THE INVENTION

The object of the invention is to provide a device and a method of the type mentioned at the outset, which allow the attachment of self-adhesive balancing weights at concave mounting surfaces of a wheel rim within short cycle times, without previously requiring a measurement of the mounting surface.

The object is achieved by a device according to one aspect of the invention and a method according to another aspect of the invention. Further developments and advantageous embodiments of the invention are discussed below.

The object is achieved according to the invention by providing a device for attaching a balancing weight to a mounting surface on an inner side of a rim dish of a wheel rim, and provides for a mounting head to be dimensioned in such a way that it fits into the rim dish and which includes a support element, which is radially displaceable relative to the wheel rim and on which a feeler element is axially movably arranged, the feeler element having a convex contact surface and a receptacle for at least one balancing weight, said receptacle being oriented towards the inner side and the mounting head being configured in such a way that the contact surface may be brought into contact with a boundary surface of the inner side, and may be displaced along said boundary surface until the balancing weight comes radially into contact with the mounting surface.

DETAILED DESCRIPTION OF THE PREFERRED EMBODIMENTS

By means of the device according to the invention, it is possible in particular to attach a balancing weight designed as an adhesive weight to the undercut annular surface provided on the inner side of the wheel rim, without the need for prior measurement of the mounting surface provided in the undercut annular surface. Due to the limited space in the case of rims with undercuts, collision-free moving of the mounting head into the mounting position of the balancing weight is difficult. The inventive design not only simplifies the positioning of the mounting head, but also accelerates the entire process of attaching and removing the mounting head.

A mechanical sensing of the mounting surface for a balancing weight is performed, in which a contact between the contact surface and a boundary surface of the wheel rim extending to the undercut annular surface is obtained. Due to the radial movement of the mounting head, the feeler element deviates axially, so that the contact between the contact surface of the feeler element and the boundary surface is maintained until the receptacle with the balancing weight radially reaches the undercut annular surface and thus the mounting surface. The mounting head is moved depending on the sensing results. The present solution is purely mechanical and simple, which also improves the cycle time of the attaching process.

According to one proposal of the invention, the feeler element is provided at its free end with a feeler head, which is designed such that it is movable into a cavity of the wheel rim. The feeler head may bring the balancing weight in position on the mounting surface in a cavity of a rim, in particular with an undercut.

The force acting on the wheel rim during the positioning of the receptacle may be reduced in that, according to a proposal of the invention, the support element is designed to be radially displaceable and in particular the support element is mounted in a slide guide and is radially displaceable in the slide guide against the force of a spring.

In one embodiment of the invention, the feeler element is mounted on the support element within a linear guide and is axially movable against the force of a spring from a basic position into an end position. The feeler element is axially displaced against the spring force by the contact established between the contact surface and the boundary surface of the wheel rim from the basic position into the end position in which the receptacle with the balancing weight rests against the mounting surface and at the same time the contact between the contact surface and the boundary surface is maintained. As soon as the balancing weight is attached to the mounting surface and the mounting head moves radially away from the inner side of the wheel rim, the feeler element is brought back into the basic position by the spring force. The leaving and returning to the basic position may be monitored by a sensor. The sensor may be provided on the support element or the feeler element and may detect the axial movement of the feeler element out of the basic position. This prevents erroneous contact with the wheel rim.

As an alternative to springs, in one embodiment of the invention, the feeler element may be arranged to be axially movable on the support element by means of a lifting cylinder. The cylinder may be a pneumatic or a hydraulic cylinder, the cylinder of which is attached to the support element and the piston of which is attached to the feeler element, so that the feeler element is repositioned by the forces of the lifting cylinder.

It is also possible that the feeler element is arranged axially movably on the support element by means of a linkage mechanism. The feeler element may be attached to the support element via articulated rods, so that at least an axial mobility of the feeler element is achieved. The linkage mechanism is low-maintenance and allows directional movement of the feeler element. Alternatively, the feeler element may be attached axially movably to the support element via a roller bearing linear slide.

In order to allow contact between the feeler element and the inner side of the wheel rim without damaging the wheel rim, it is proposed that the contact surface is coated at least in part with a plastics material. As a result, good sliding properties, high abrasion and wear resistance and a long service life may be achieved. The contact surface may also be part of a component, such as a bar, which is attachable to the feeler element by means of mounting means. The component is arranged in a region of the feeler element, in particular the feeler head, in which the contact with the boundary surface of the wheel rim is to be established.

According to a proposal of the invention, the mounting head may be rotatably mounted about an axis in any desired mounting position on the mounting surface by means of a rotary drive, which is controllable by a control device. In order to enable a movement to different balancing positions, the mounting head may be rotatable about its axis of rotation. In this regard, it is also advantageous if the feeler element has a plurality of receptacles, so that after attaching a first balancing weight in a first balancing position, the mounting head moves into a further balancing position for attaching a further balancing weight. A fast turning of the mounting head is achieved by the rotary drive.

The mounting head may be provided with a pressing device, which can be actuated by a control device, for pressing the balancing weight against the mounting surface of the wheel rim. The balancing weight designed as an adhesive weight may be rolled by means of the pressing device onto the mounting surface, in particular in the undercut annular surface, for example, so that a planar contact is produced.

In one embodiment of the invention, the mounting head is arranged on an arm of a program-controlled handling device. The handling device may be designed as a program-controlled robot, on the arm of which the mounting head is arranged. The robot may be movable in all three spatial axes. However, simple handling devices may also be selected, which only control the insertion of the mounting head into the rim dish and the radial movement thereof. The control of the mounting head may be force-controlled or stroke-controlled. The mounting head may advantageously be attached to the arm of the handling device by means of a quick-change coupling. Furthermore, in another embodiment, the mounting head may be arranged in a stationary manner on a machine frame, so that the wheel rim to be balanced is slipped over the operating arm.

The invention further relates to a method for attaching a balancing weight to a mounting surface on an inner side of a rim dish of a wheel rim, comprising the following steps: moving a mounting head into the rim dish, wherein the mounting head has a feeler element with a receptacle for at least one balancing element;

moving the mounting head radially outwards so that contact is made between a convex contact surface of the feeler element and a boundary surface of the inner side of the wheel rim; continuing the radial movement, wherein the contact surface slides along the boundary surface of the inner side until the balancing weight comes radially into contact with the mounting surface; attaching the balancing weight to the mounting surface. It is advantageous if the feeler element, while sliding along the contact surface on the boundary surface, axially deviates in a linear guide. As a result, damage to the wheel rim by the feeler element may be avoided.

The advantages presented above, as well as advantageous embodiments of the device apply analogously to the method.

BRIEF DESCRIPTION OF THE DRAWINGS

The invention will be explained in more detail in the following with reference to an embodiment of the invention shown in the drawings, in which:

FIG. 1 shows a mounting head 1 for attaching a balancing weight 2 to an inner side 3 of a rim 4 of a vehicle wheel. The mounting head 1 is rotatable about its axis of rotation and may be attached by means of a quick-change coupling to the end of an articulated arm of a handling device, such as a robot, whose movement is controllable in all three spatial axes. However, arms of simpler handling devices may also be selected, which introduce the mounting head 1 at least linearly in the rim dish and move radially to the inner side 3 of the wheel rim. The mounting head 1 may be mounted in a radially pivotable manner on the arm of the handling device and rotatably mounted as a whole. The mounting head 1 may be positioned under the control of a program so that it may move the balancing weights 2 to each balancing point in the predetermined balancing planes.

Figure 1:
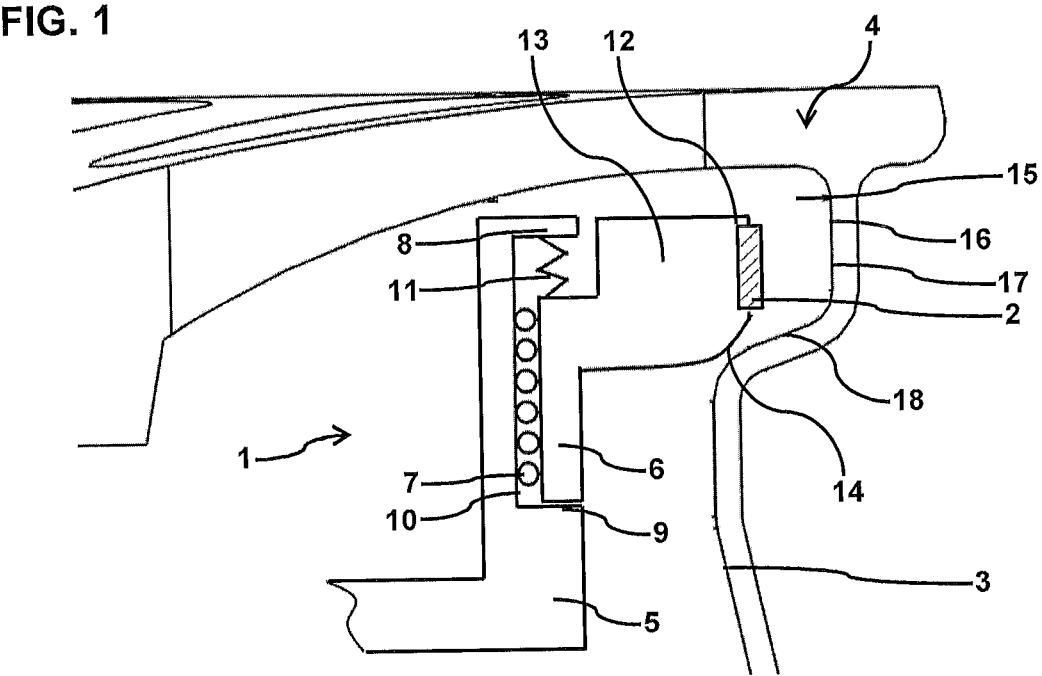
FIG. 1 is a schematic representation of a mounting head in a rim dish of a wheel rim.

However, it may also be provided that the mounting head 1 is arranged in a stationary manner on a machine frame and the wheel rim 4 is slipped over the stationary mounting head 1 by means of a gripper of a handling robot. Embodiments of a mounting head 1 are known from DE 10 2013 108 048 B3.

The mounting head 1 may be arranged on a support which extends transversely to the axis of rotation and on which a support element 5 extending parallel to the axis of rotation and extending into the rim dish is arranged. The support element 5 may be mounted in a radially displaceable manner in that it is movable within a slide guide transversely to the axis of rotation and, for example, against the force of a spring.

On the support element 5, a stepped feeler element 6 is mounted in an axially movable manner. For this purpose, the feeler element 6 may be guided by means of a linear slide, which is movably supported by means of a roller bearing 7 in a guide 10, which is delimited by an upper and a lower end stop 8, 9. In the guide 10, a return spring 11 is arranged between the support element 5 and the upper end stop 8 of the feeler element 6, so that the feeler element 6 is moved axially against the force of the return spring 11 from an end position. By arranging a further spring, which is attached to the lower end stop 9, the feeler element 6 may be present in a central position, from which it is movable axially upwards or downwards against the force of the springs. A sensor may monitor the position of the feeler element 6 and be used to control the mounting head 1. The sensor may be arranged on the support element 5 or the feeler element 6. The feeler element 6 may also be arranged axially movably on the support element 5 via a pneumatic or hydraulic cylinder. The mounting of the feeler element 6 on the support element 5 by means of a linkage mechanism is also possible, wherein the feeler element 6 is movably mounted on the support element 5 by means of articulated rods.

At a free end of the feeler element 6, a receptacle 12 for at least one balancing weight 2 is arranged. The receptacle 12 may consist of a curved rail of rectangular cross section with a convex surface. The receptacle 12 may comprise magnetic material and be designed to hold magnetisable balancing weights 2. Due to the magnetic effect, the balancing weight 2 may be held on the receptacle 12 for transport. Also, a clamping of the balancing weight 2 in the receptacle 12 may be provided. In this case, the balancing weight 2 may be held in position by means of locking fingers. It is also possible to hold the balancing weight 2 by means of a negative pressure. The mounting of the balancing weight 2 on the wheel rim 4 is obtained by gluing. For this purpose, the balancing weight 2 is coated on the side facing the inner side 3 with an adhesive layer. The attachment of the adhesive weight may be achieved by a continuous radial movement of the mounting head 1, wherein the adhesive weight is resiliently held in the receptacle 12 in order to achieve a corresponding minimum contact pressing force without damaging the wheel rim 4. The balancing weight 2 may be rolled on, for example.

The feeler element 6 has a feeler head 13 comprising the receptacle 12, the side of which facing the wheel rim inner side 3 is bent radially according to the curvature of the inner side 3. Adjacent to the receptacle 12, a convex contact surface 14 is arranged with a circularly curved edge region. The slope of the contact surface 14 has an inclination of approximately 45° and runs over the full width of the feeler head 13. The contact surface 14 may also be curved. The contact surface 14 is made of a sliding plastics material or is at least coated therewith. For manufacturing reasons, the feeler element 6 may be made entirely or at least in part of a plastics material.

Balancing of vehicle wheels with adhesive weights is also possible in case of wheels having an undercut. In this case, a cavity 15 is present in front of the spoke root. The predetermined balancing planes are usually located on a concave undercut annular surface 16 which is present in the cavity 15 and are axially spaced from one another, i.e. a cylindrical mounting surface 17 of the balancing weights 2 lies within the undercut annular surface 16. The specific balancing points and the size of the balancing weights 2 are calculated by an imbalance measuring device and transmitted, for example, to an electronic robot controller.

The mounting head 1 is controlled for attaching the balancing weight 2 to the mounting surface 17 so that it dips into the rim dish and the receptacle 12 faces the wheel rim inner side 3 essentially at a radial distance. The receptacle 12 in this initial position is not yet at the same height as the mounting surface 17, but lies slightly lower, so that the contact surface 14 of the feeler element 6 faces an oblique boundary surface 18 of the wheel rim inner side 3 extending towards the undercut annular surface 16.

Figure 2:
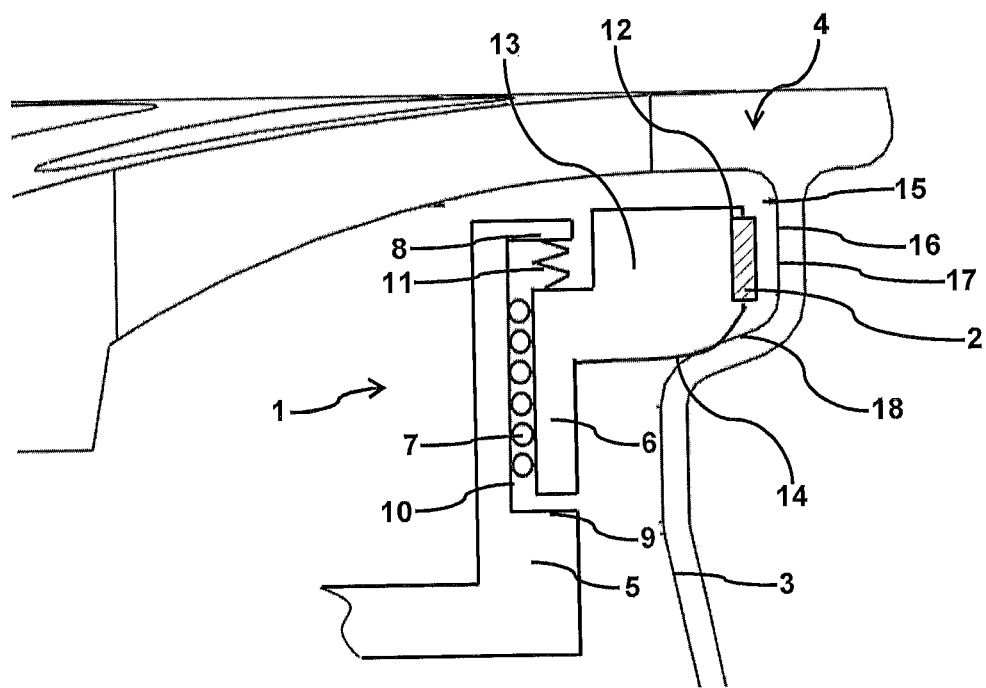
FIG. 2 shows a feeler element of the device resting on the rim dish.
Figure 3:
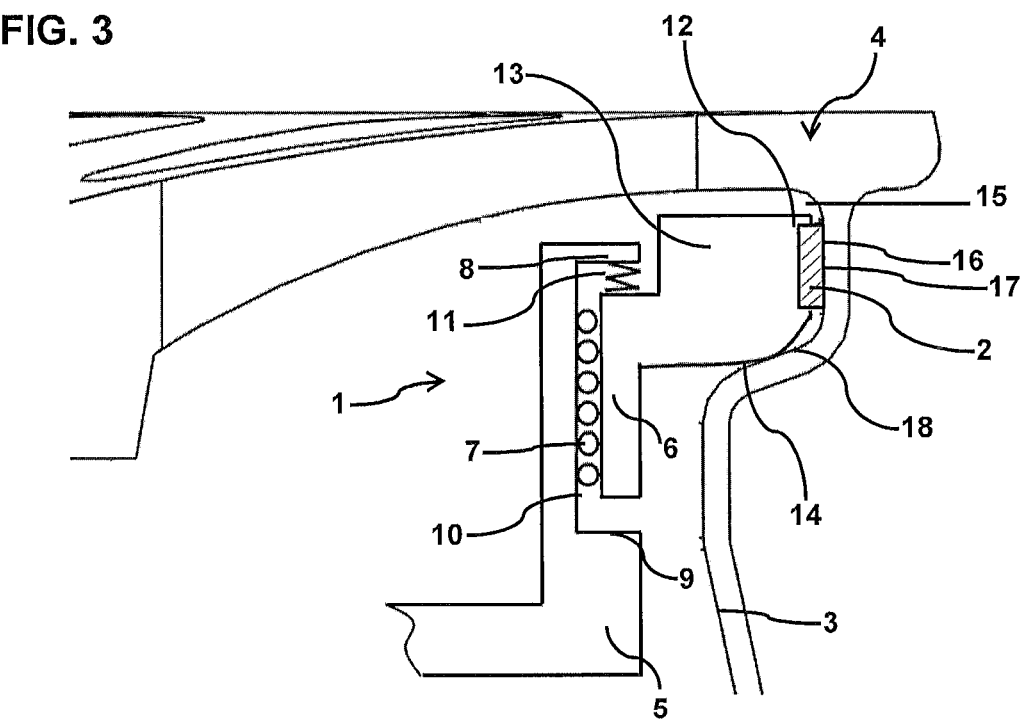
FIG. 3 shows the positioning of a receptacle for a balancing weight on a mounting surface.

FIG. 2 shows a contact of the feeler element 6 of the device with the rim dish, and FIG. 3 shows the positioning of the receptacle 12 for the balancing weight 2 on the mounting surface 17. The mounting head 1 moves by performing a radial movement transversely to the axis of rotation in the direction of the wheel rim inner side 3, wherein the contact surface 14 of the feeler element 6 comes into contact with the oblique boundary surface 18. Due to the continuous radial movement of the mounting head 1, the contact surface 14 slides along the oblique boundary surface 18. The feeler element 6 deviates here due to the movable mounting on the support element 5 in the axial direction against the force of the return spring 11 and is moved out of a basic position. The basic position may be, depending on the configuration of the axially movable mounting of the feeler element 6 on the support element 5, an end position or a middle position. It is also possible that the feeler head 13 comes into contact with an element of the wheel rim 4 which is not shown and which is arranged above the mounting surface 17, so that the feeler head 13 senses the mounting surface 17 and the feeler element 6 deviates downwards from its normal position. Due to the movable mounting of the feeler element 6, the forces acting on the wheel rim inner side 3 are small and damage to the wheel rim 4 is avoided.

The radial movement of the mounting head 1 and the axial deflection of the feeler element 6 continue until the balancing weight 2 radially abuts the undercut annular surface 16 or the mounting surface 17 provided here. At the same time, the feeler element 6 is in an end position in which the return spring 11 is compressed. The balancing weight 2 may then be attached to the mounting surface 17, for example, by rolling on. After successful attachment, the mounting head 1 moves radially into the starting position, so that the contact surface 14 slides along the oblique boundary surface 18 and the feeler element 6 is moved by the spring force of the return spring 11 from the end position into the basic position.

The height of the contact surface 14 of the feeler element 6 is designed such that it may slide along the oblique boundary surface 18 of the wheel rim, reaching the end position when the balancing weight 2 abuts, with its adhesive surface, the mounting surface 17 provided in the undercut annular surface 16. The feeler head 13 of the feeler element 6, which surrounds the receptacle 12 and protrudes into the cavity 15 of the undercut, is dimensioned in such a way that, on the one hand, the contact surface 14 comes into contact with the oblique boundary surface 18 of the wheel rim 4 and also remains in contact therewith during the attachment of the balancing weight 2 and, on the other hand, the receptacle 12 with the balancing weight 2 is pressed against the mounting surface 17. When the balancing weight 2 is pressed against the mounting surface 17, an optionally radially displaceably mounted support element 5 is displaced against the force of springs, so that no excessive force, which may damage the wheel rim 4, acts on the rim.

The displaceability of the feeler element 6 and the return spring 11 ensure an exact height positioning. The radial displaceability, which may act against a spring force, of the support element 5 ensures a minimum contact force. The control of the mounting head 1 need not be force-controlled, but may be positional, which can be achieved by sensors. Furthermore, proximity switches may verify whether the support element 5 and the feeler element 6 are moved far enough during positioning of the feeler head 13 so that the return spring 11 and other optional springs may be loaded according to a required minimum contact force.

The invention claimed is:

1. A device for attaching a balancing weight (2) to a mounting surface (17) on an inner side (3) of a rim dish of a wheel rim (4), comprising a mounting head (1) which is dimensioned in such a way that it fits into the rim dish and which includes a support element (5), which is radially displaceable relative to the wheel rim (4) and on which a feeler element (6) is axially movably arranged, the feeler element (6) having a circular arc-shaped curved contact surface (14) which is convex in radial section and a receptacle (12) for at least one balancing weight (2), wherein the feeler element is displaceable relative to the support element transversely to movement of the support element, said receptacle being oriented towards the inner side (3) and the mounting head (1) being configured in such a way that the contact surface (14) is brought into contact with a boundary surface (18) of the inner side (3), and is displaceable along said boundary surface until the balancing weight (2) comes radially into contact with the mounting surface (17).

2. The device of claim 1, wherein the feeler element (6) has at its free end a feeler head (13), which is configured such that it is movable into a cavity (15) of the wheel rim (4).

3. The device of claim 1, wherein the support element (5) is radially displaceable.

4. The device of claim 1, wherein the feeler element (6) is supported on the support element (5) within a straight guide and is axially movable against the force of a spring (11) from a basic position to an end position.

5. The device of claim 3, wherein the feeler element (6) is axially movably positioned using a lifting cylinder on the support element (5).

6. The device of claim 1, wherein the contact surface (14) is at least partially coated with a plastics material.

7. The device of claim 1, wherein the contact surface (14) is part of a component attached to the feeler element (6).

8. The device of claim 1, wherein on the support element (5) or the feeler element (6) a sensor is provided, which senses the axial movement of the feeler element (6).

9. The device of claim 1, wherein the mounting head (1) is mounted on the mounting surface (17) in such a way that it is rotatable about an axis in any mounting position by means of a rotary drive, which is controllable by a control device.

10. The device of claim 1, wherein the mounting head (1) is positioned on an arm of a program-controlled handling device.

11. The device of claim 1, wherein the mounting head (1) is attached to the arm of the handling device by means of a quick-change coupling.

12. The device of claim 1, wherein the mounting head (1) is positioned stationary on a machine frame.

13. A method for attaching a balancing weight (2) to a mounting surface (17) on an inner side (3) of a rim dish of a wheel rim (4), comprising the following steps:
  moving a mounting head (1) into the rim dish, wherein the mounting head (1) has a feeler element (6) with a receptacle (12) for at least one balancing element (2), the feeler element (6) having a circular arc-shaped curved contact surface (14) which is convex in radial section and a receptacle (12) for at least one balancing weight (2), wherein the feeler element is displaceable relative to the support element transversely to movement of the support element;
  moving the mounting head (1) radially outwards so that contact is made between a convex contact surface (14) of the feeler element (6) and a boundary surface (18) of the inner side (39 of the wheel rim;
  continuing the radial movement, wherein the contact surface (14) slides along the boundary surface (18) of the inner side (3) until the balancing weight (2) comes 30 radially into contact with the mounting surface (17);
  attaching the balancing weight (2) to the mounting surface (17).

14. The method of claim 13, wherein while the contact surface (14) is sliding along the boundary surface (18), the feeler element (6) axially deviates within a straight guide.

\* \* \* \* \*